Patented May 6, 1947

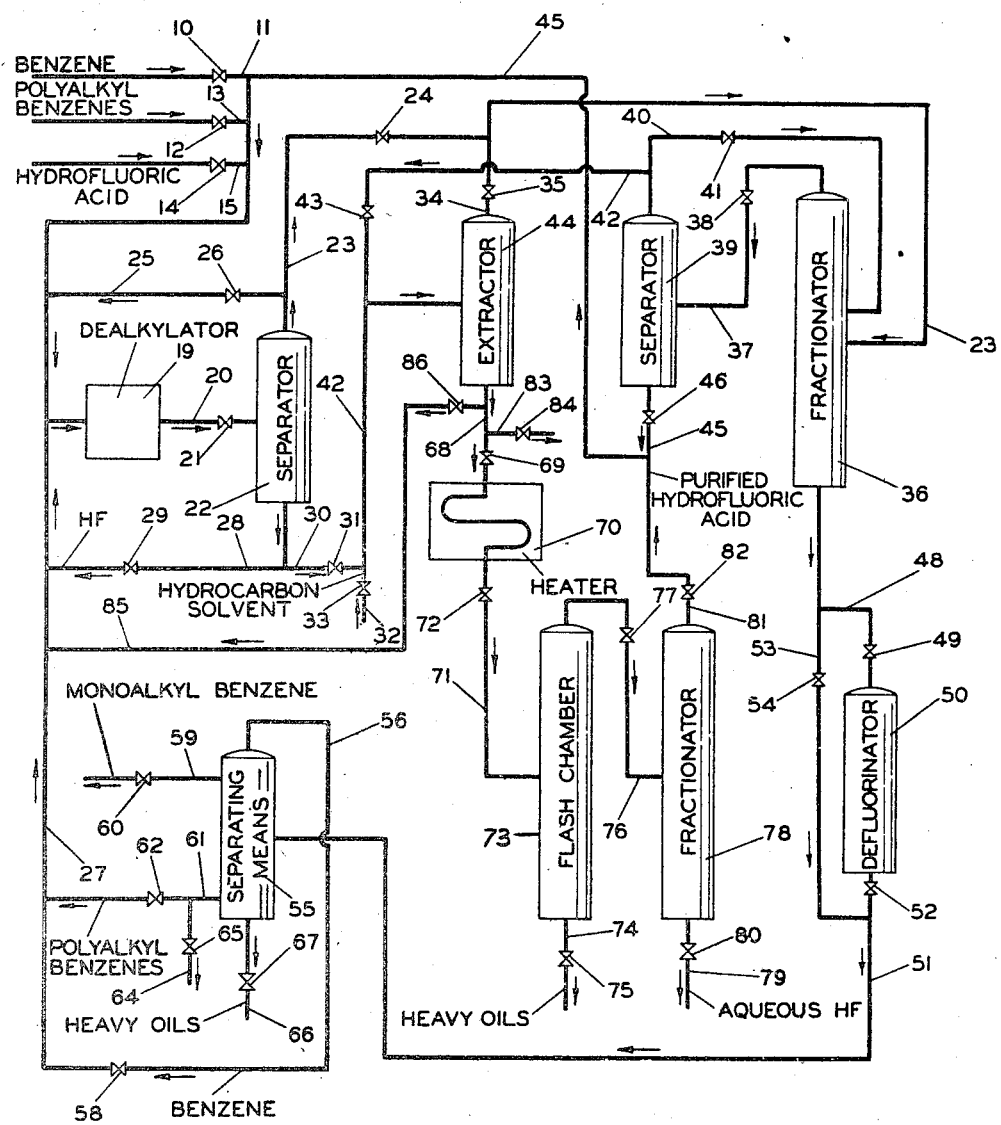

2,420,073

UNITED STATES PATENT OFFICE 2,420,073

PROCESS OF PARTIAL DEALKYLATION

Frederick E. Frey, Bartlesville, Okla., assignor to Phillips Petroleum Company, a corporation of Delaware Application May 5, 1942, Serial No. 441,875

6 Claims. (Cl. 260—671)

This invention relates to partial dealkylation of polyalkylated organic compounds, and more particularly to such dealkylation in the presence of hydrofluoric acid. This application is a continuation-in-part of my copending application, Serial No. 431,571, filed February 19, 1942, now U. S. Patent 2,394,905, granted February 12, 1946.

When organic compounds are alkylated, as in the presence of an alkylation catalyst such as hydrofluoric acid, sulfuric acid, aluminum chloride, boron fluoride, or the like, the alkylation reaction almost invariably yields products of more than one molecular composition. That is, the alkylation product comprises compounds formed by the occurrence of two or more successive or simultaneous alkylations as well as the compound formed by a single alkylation. For example, as was shown in Example III of the aforementioned copending application, subjecting 15.7 pounds of chemically pure benzene to batch alkylation with 1.18 pounds of gradually added ethylene in the presence of 11.5 pounds of substantially anhydrous hydrofluoric acid at a temperature of 115 F. for a period of 30 to 90 minutes gave a liquid hydrocarbon product consisting of 80.3 per cent monoethylbenzene by weight, 16.8 per cent diethylbenzene, and 2.9 per cent other polyethylbenzenes. Similarly, in the alkylation of benzene with other olefins, such as propylene, butylene, and the like, the product is usually a mixture of the monoalkylbenzene and one or more polyalkylbenzenes. When only the monoalkylbenzene is desired, the production of the polyalkylbenzenes represents an undesirable loss of valuable materials.

An object of this invention is to convert polyalkylbenzenes to monoalkylbenzenes.

Another object of this invention is to utilize polyalkylbenzenes, which ordinarily are of less value as aviation gasoline and as intermediates for chemical synthesis than monoalkylbenzenes.

Another object of this invention is to utilize the advantages of anhydrous hydrofluoric acid for effecting partial dealkylation.

Other objects of this invention will become apparent from the following description, the accompanying drawing, and/or the appended claims.

This invention comprises transferring one or more alkyl groups from one cyclic hydrocarbon nucleus to another cyclic hydrocarbon nucleus or to different positions in the same nucleus in the presence of concentrated or anhydrous hydrofluoric acid as a catalyst. The cyclic hydrocarbon nuclei may be aromatic or naphthenic, monocyclic, or polycyclic, and the alkyl groups may have any number of carbon atoms.

In one particularly useful embodiment, this invention comprises the transfer of alkyl radicals from polyalkylbenzenes to benzene to produce a maximum amount of monoalkylbenzenes, using substantially anhydrous hydrofluoric acid as the catalyst for effecting this transfer. The general overall reaction involved for production of monoalkylbenzenes may be expressed by the following equation:

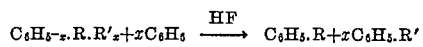
$$C_6H_{5-x}.R.R'_x + xC_6H_6 \xrightarrow{HF} C_6H_5.R + xC_6H_5.R'$$

where $x$ is any integer between 1 and 5, inclusive, R is any alkyl group and each R' is any alkyl group of at least two carbon atoms per molecule. Preferably neither R nor R' should contain more than about five carbon atoms per molecule.

An understanding of this invention may be aided by referring to the accompanying drawing, which is a schematic flow diagram of a preferred arrangement of apparatus suitable for practicing this invention, which will be illustrated in connection with the dealkylation of a polyalkylbenzene by reaction with benzene.

In this arrangement, benzene is admitted through valve 10 in inlet 11 to dealkylator 19. A polyalkylbenzene is similarly admitted through valve 12 in inlet 13, and concentrated hydrofluoric through valve 14 in inlet 15. As shown, these three materials are mixed before they enter dealkylator 19; however, they may be introduced individually or in any combination desired by suitable modification of the inlet connections.

Dealkylator 19 may be any convenient reaction vessel having an agitating means and capable of withstanding the reaction conditions. One inexpensive but efficient type of reaction chamber which has been found advantageous consists of a vertical cylindrical chamber having a jet-type inlet near the bottom for the hydrocarbon feed, an inlet near the bottom for hydrofluoric acid, or a single inlet for the combined hydrocarbon-acid feed, and an outlet near the top. Because at elevated temperature the benzene-polyalkylbenzene feed is appreciably soluble in the hydrofluoric acid, very little stirring apparatus is required to obtain suitably efficient mixing and intimate contacting of the several components of the reaction mixture.

In dealkylator 19 either fresh hydrofluoric acid, or acid which has been previously used for alkylation of benzene with olefins and which contains alkyl fluoride and other acid-soluble material, or any desired mixture of fresh and used acid, may be used as the catalyst for carrying out the desired dealkylation reaction. When used acid is employed as catalyst, this process serves simultaneously to purify the impure hydrofluoric acid and to effect the desired dealkylation reaction. The conditions for dealkylation are preferably somewhat more drastic than those described in the aforementioned copending application for the alkylation of benzene because the reaction of polyalkylbenzene with benzene to form monoalkylbenzene is slower than the alkylation of benzene. Suitable dealkylation conditions are: a temperature in the range of about 100 to 800 F., preferably in the range of about 350 to 800 F. in the case of dealkylation of a polyalkyl benzene containing at least one methyl group to form toluene and 200 to 400 F. in the particular case of dealkylation of polyethylbenzenes; pressure sufficient to maintain the liquid or a corresponding dense state; and intimate contacting for a reaction time of from about 5 to 500 minutes or more. Under these conditions alkyl fluorides and other acid-soluble materials, such as are present in used acid from hydrofluoric acid alkylation processes, are converted mainly to materials less soluble in acid, such as alkylbenzenes; and polyalkylbenzenes are converted substantially to monoalkylbenzene. If desired, catalyst promoters such as inorganic fluorides soluble in hydrofluoric acid and/or contact masses may be used to aid the reaction and to lessen the severity of the treating conditions. Fresh anhydrous acid is usually most rapid in its action, and is generally preferred for this reason so long as the ultimate operating cost is not too high. At least as much benzene should be present as will be needed to form monoalkyl derivatives of the polyalkyl benzene or benzenes charged, and preferably there should be a substantial excess. It is preferred to have at least 5 moles of benzene for every alkyl group in excess of one in the polyalkylbenzene, and in some instances it may be desirable to have as much as 100 moles of benzene. The amount of hydrofluoric acid should be such that, under liquid phase conditions, a separate hydrofluoric acid phase will exist.

The use of hydrofluoric acid for catalyzing these reactions is of particular advantage because this material is free from certain defects of such catalysts as sulfuric acid and aluminum chloride, the use of which has been proposed in the literature. Sulfuric acid forms organic oxidation products which waste the polyalkylbenzenes charged and the catalyst, and make recovery and regeneration of sulfuric acid from the resulting sludges extremely difficult. Aluminum chloride likewise forms complex organic sludges, from which it is extremely difficult to recover the organic reactants and the aluminum chloride for reuse in the process. With hydrofluoric acid, there is very little waste of the organic reactants in the formation of organic tars or sludges, and the regeneration or recovery of hydrofluoric acid from such tars or sludges or other undesired products as may be formed is relatively simple and complete, so that very little hydrofluoric acid is lost. Consequently, the ultimate catalyst cost for the hydrofluoric acid process is quite low in comparison with that of processes using sulfuric acid or aluminum chloride.

The reaction mixture from treater 19 is passed through conduit 20 having valve 21 to separator 22, wherein it is separated into two liquid phases, as by cooling and/or gravitational settling or centrifugation. The lighter or hydrocarbon phase may be partially recycled to dealkylator 19, as through conduit 25 having valve 26; or, if desired, it may be sent to a hydrofluoric acid alkylator not shown in the drawing for alkylation of excess benzene with olefin to form principally monoalkylbenzene. When this hydrocarbon phase contains relatively large proportions of monoalkylbenzene or other desired products, as is generally the case, it may be passed entirely or in part through conduit 23 having valve 24 to column or fractionator 36. Most of the heavier or hydrofluoric acid phase from separator 22 may be recycled through conduit 28 having valve 29 to treater 19; however, a substantial part of it is preferably passed through conduit 30 having valve 31 to extractor 44.

A solvent for aromatics that has a low specific gravity and is substantially immiscible with liquid anhydrous hydrofluoric acid, such as propane or one or more butanes or pentanes, preferably normal butane, may be added through inlet 32 having valve 33 to extractor 44 to extract hydrocarbons dissolved or suspended in the acid. The desirability for this solvent-extraction step arises because benzene and the alkylbenzenes are appreciably soluble in anhydrous hydrofluoric acid and because the difference in density between them and hydrofluoric acid is relatively low; also, in a subsequent distillation step, such a material as butane can be used to aid in removing dissolved hydrogen fluoride from the desired products. The proportion of solvent is preferably in the range of about 10 to 100 per cent by weight of the acid; for optimum results, it is dependent somewhat upon the temperature used in the separating step, being greater the higher the temperature. At whatever extraction temperature is used the amount of solvent should be such that a separate liquid solvent phase can exist in contact with the liquid hydrofluoric acid, and in addition the solvent should contain the major part of the hydrocarbons originally dissolved in the hydrofluoric acid. A hydrocarbon or extract layer is withdrawn from extractor 44 and is passed through conduit 34 having valve 35 to fractionator 36.

Low boiling hydrocarbons, and particularly butanes, have the characteristic of forming minimum-boiling azeotropic mixtures with hydrogen fluoride. In one modification of my process this characteristic is taken advantage of to effect a purification and concentration of the hydrofluoric acid and also to facilitate removal of hydrofluoric acid from hydrocarbon products of the process. The hydrocarbon streams passing through conduits 23 and 34 will contain small but appreciable amounts of dissolved hydrofluoric acid. By taking advantage of this azeotropic characteristic, a low boiling mixture of hydrofluoric acid and the aforementioned solvent is removed as an overhead stream from fractionator 36 and is passed through conduit 37 having valve 38 to separator 39, wherein the mixture is separated, as by cooling and settling into a solvent phase and a hydrofluoric acid phase. The solvent phase may be returned in part through conduit 40 having valve 41 as reflux to column 36; preferably, a substantial proportion of it is recycled through conduit 42 having valve 43 to extractor 44. The hydrofluoric acid phase from separator 39 may be recycled through conduit 45 having valve 46 to dealkylator 19.

A bottom fraction from column 36, comprising hydrocarbons substantially free from hydrofluoric acid but usually containing a trace of organically combined fluorine, is passed through conduit 48 having valve 49 to defluorinator 50, wherein organic fluorine is substantially completely removed by contacting the hydrocarbon, usually in the liquid condition, with a dehydrogenation or hydrogenation-type catalytic contact mass at a temperature in the range of about 50 to 500 F. Although any of many contact masses having hydrogenation and/or dehydrogenation properties may be used, bauxite is preferred because of its availability and low cost.

A substantially fluorine-free hydrocarbon effluent from defluorinator 50 is passed through conduit 51 having valve 52 to separating means 55, which may consist of any known means such as fractionation or solvent-extraction units for separating the effluent into desired fractions. A benzene fraction is recovered and recycled through conduit 56 having valve 58 to dealkylator 19. A monoalkylbenzene fraction is withdrawn as a product of the process through outlet 59 having valve 60. Polyalkylbenzenes may be recycled through conduit 61 having valve 62 to dealkylator 19, or may be withdrawn through conduit 64 having valve 65, particularly if it is desired to fractionate or separate therefrom certain polyalkylbenzenes other than those present in the initial charge stock. Other products, such as high-boiling oils, may be withdrawn through 66 having valve 67.

In instances in which the product does not contain an objectionable proportion of organic fluorine, the bottom fraction from column 36 may be bypassed around defluorinator 50 through conduit 53 having valve 54 by closing valves 49 and 52 and opening valve 54. In other instances, when organic fluorine compounds are present but need not be removed from the entire fraction passing through conduit 48, any desired fraction of the alkylated benzene may be first isolated and then treated to remove objectional organic fluorine; for example, the desired monoalkylbenzene withdrawn through conduit 59 may be so treated, whereas fractions comprising chiefly unreacted benzene and/or polyalkylbenzene may be recycled to the process without removal of organic fluorine. Also, if defluorinator 50 is used to remove organic fluorine from the kettle product of column 36, a re-treatment of the monoalkylbenzene fraction in a second auxiliary defluorination step, not shown, may be advantageous to remove final minute traces of such fluorine.

The heavier or hydrofluoric acid phase from extractor 44 is passed through conduit 68 having valve 69 and may be at least in part discharged from the system through conduit 83 and valve 84 and/or recycled through conduit 85 and valve 86 to dealkylator 19. However, preferably at least a portion is reclaimed by being passed through heater 70, wherein it is heated to an elevated temperature, preferably in the range of about 250 to 500 F., high enough to decompose fluoro-organic compounds. From heater 70 the material passes through conduit 71 having valve 72 to a fractionator or flash chamber 73, which effects a separation into high-boiling oil, which is withdrawn through outlet 74 having valve 75, and into an acid fraction (containing any water brought incidentally or inadvertently into the process) which is passed through conduit 76 having valve 77 to fractionator 78. From fractionator 78, a kettle fraction comprising a constant-boiling aqueous solution of hydrofluoric acid is withdrawn through outlet 79 having valve 80, and an overhead fraction of substantially anhydrous hydrofluoric acid is recycled through conduit 81 having valve 82 back to dealkylator 19.

In addition to the arrangement shown in the drawing, there are many modifications of this invention which will be obvious, in the light of the present disclosure and discussion, to those skilled in the art. For example, in some cases, as when centrifuges are used in the steps for separating two liquid phases of different densities, the use of solvent extractors, such as extractor 44, to aid the separation, may be unnecessary. Additional pumps, valves, fractionators, separators, conduits, and the like, such as are well-known in the art of chemical engineering, may be used wherever they are necessary or convenient for obtaining the results indicated. It is also considered to be within the scope of this invention to use catalyst modifiers, such as inorganic or organic compounds resistant to hydrofluoric acid, in the dealkylating zone to increase the efficiency of the reaction, to increase the mutual solubility of the reactants and hydrofluoric acid, or the like; polar organic compounds resistant to hydrofluoric acid, such as certain nitrogen- and/or oxygen-containing compounds, are advantageous in this respect. However, it is intended that hydrofluoric acid shall be the effective catalyst.

As previously mentioned, this invention applies particularly to the dealkylation of polyalkylbenzenes to form monoalkylbenzenes, although it is not restricted thereto but may be utilized for production of di-, tri- or other alkylated benzene derivatives from higher and lower alkylated derivatives by suitable adjustment of the operating conditions. The alkyl derivatives are ordinarily ethyl, propyl, and butyl derivatives, although they may be amyl or higher alkyl derivatives; mixed di- or higher alkyl derivatives may be produced by suitable selection of reactants. Less rigorous dealkylation conditions are required for dealkylating polyalkylbenzenes having groups heavier than ethyl than are required for dealkylating polyethylbenzenes. This process may also be used for the dealkylation of polyalkyl derivatives of polynuclear aromatics such as, for example, those of naphthalene, anthracene, phenanthrene, and the like. This process may likewise be applied to the dealkylation of polyalkyl derivatives of cycloparaffins such as, for example, those of cyclohexane and cyclopentane. Various mixed polyalkylbenzenes may also be converted; thus by reacting cymene and benzene high yields both of toluene and of isopropylbenzene are obtained, and from propyl-butylbenzene and benzene high yields of propylbenzene and butylbenzene are obtained.

To illustrate further some of the many aspects of this invention, the following examples are given, without necessarily limiting the invention thereto.

*Example I*

Treatment of diethylbenzene, obtained as a by-product of hydrofluoric acid ethylation of benzene, for one hour at 304 F., using 9.85 moles of benzene per mole of diethylbenzene in the presence of 23.4 moles of substantially anhydrous hydrofluoric acid and with vigorous stirring gave a hydrocarbon product containing 81.8 per cent ethylbenzene, 16.4 per cent diethylbenzene, and 1.8 per cent heavier, expressed as volume percentages. These products accounted for 97 per cent of the ethyl radicals of the original diethylbenzene; 0.5 per cent of the original ethyl radicals was found as acid-soluble material, and only 2.5 per cent was unaccounted for, being lost through mechanical losses. These data show that excellent dealkylation of the diethylbenzene to monoethylbenzene was obtained.

*Example II*

Treatment of diethylbenzene for one hour at 188 F., using 9.68 moles of benzene per mole of diethylbenzene in the presence of 26.3 moles of substantially anhydrous hydrofluoric acid and with vigorous stirring, gave a product containing 12.8 volume per cent ethylbenzene, 82.0 per cent unreacted diethylbenzene, and 5.2 per cent heavier. These products accounted for 88.1 per cent of the ethyl radicals of the original diethylbenzene; 2.8 per cent of the original ethyl radicals was found as acid-soluble material, and 9.1 per cent was unaccounted for, being lost through mechanical losses. Comparison of this example with Example I shows that 188 F. was too low a temperature for obtaining a rapid or extensive dealkylation of diethylbenzene, but appreciable reaction still took place.

*Example III*

Polyisopropylbenzene, such as that obtained as a high-boiling residue from the catalytic isopropylation of benzene, is converted to monoisopropylbenzene in yields of about 80 to 95 per cent of the theoretical yield by reacting at about 300 F. with a several-fold molecular excess of benzene in the presence of liquid substantially anhydrous hydrofluoric acid, equal approximately in volume to the hydrocarbons. The mixture is mechanically stirred for a reaction time of about 45 minutes, and the effluent passed to separating means, from which is recovered monoisopropylbenzene.

*Example IV*

Tributylbenzene, in the presence of a multimolecular excess of benzene, is converted, while in contact with substantially anhydrous hydrofluoric acid as a catalyst, into monobutylbenzene at a temperature of about 300 F. The butylbenzene recovered from the effluent, and defluorinated is a valuble constituent of premium aviation gasoline.

This invention provides a practical process for the dealkylation of polyalkylbenzenes with benzene or relatively lower alkylbenzene derivatives in the presence of anhydrous hydrofluoric acid as a catalyst to produce monoalkylbenzenes or intermediate alkylbenzenes containing alkyl substituents intermediate in number between those contained in the initial reactants. The alkyl groups of the polyalkylbenzene need not have one and the same number of carbon atoms but may have different numbers of carbon atoms. As indicated by Example I, polyethylbenzenes that are ordinarily waste products from the ethylation of benzene can be made to react practically quantitatively with benzene to form monoethylbenzene, which is particularly valuable as a constituent of aviation fuel or as a raw material for dehydrogenation to styrene.

It will be appreciated that the invention may be practiced otherwise than as specifically described herein, and many modifications and variations of it will be obvious to those skilled in the art from the disclosure and may be practiced without departing from the spirit of the teachings or from the scope of the appended claims.

What is claimed is:

1. A process for converting a polyalkylbenzene to an alkyl derivative of benzene having fewer alkyl groups per molecule, which comprises treating a polyalkylbenzene in admixture with a substantial molecular excess of an aromatic hydrocarbon of the class consisting of benzene and alkylbenzenes having at least two alkyl groups fewer than said polyalkylbenzene and in the presence of hydrofluoric acid which has been previously utilized as a catalyst in the alkylation of benzene with olefins and which contains alkyl fluorides, as the effective catalyst to produce an alkyl derivative of benzene having fewer alkyl groups than said polyalkylbenzene while at the same time converting said alkyl fluorides to alkyl benzenes, and recovering from effluents of said treatment said alkyl derivative so produced.

2. A process for producing monoalkylbenzene, which comprises mixing polyalkylbenzene with an excess of benzenes and hydrofluoric acid; subjecting the resulting mixture to a treatment to produce monoalkylbenzene; separating effluents of said treatment into a liquid hydrocarbon phase and a liquid hydrofluoric acid phase; admixing with said liquid hydrofluoric acid liquid butane in an extraction step to recover dissolved hydrocarbon material from said hydrofluoric acid; separating said liquid butane from said liquid hydrofluoric acid and admixing said butane with the aforesaid hydrocarbon phase; subjecting the combined hydrocarbon material to fractional distillation and recovering a low-boiling mixture containing butane together with all the hydrofluoric acid contained in said hydrocarbon material; cooling and condensing said low-boiling mixture to form a liquid butane phase and a liquid hydrofluoric acid phase; returning said hydrofluoric acid to said dealkylation step; returning said butane phase to said extraction step; and recovering from said distillation a substantially pure monoalkylbenzene product.

3. A process for producing an alkylbenzene having fewer alkyl groups per molecule from a more highly alkylated polyalkylbenzene, which comprises treating an admixture of polyalkylbenzene, benzene and hydrofluoric acid under reaction conditions to produce an alkylbenzene having fewer alkyl groups than said more highly alkylated polyalkylbenzene, passing effluents of said treatment to separating means under conditions such as to effect separation between a liquid hydrocarbon phase and a liquid hydrofluoric acid phase, passing said hydrocarbon phase to fractional distillation means, extracting said hydrofluoric acid phase with a low boiling paraffin hydrocarbon in liquid phase to remove from said hydrofluoric acid hydrocarbons dissolved therein, passing hydrocarbon material resulting from said extraction to the aforesaid distillation means, separating from said distillation means as a low boiling fraction a mixture comprising said low boiling paraffin and hydrofluoric acid, cooling and condensing said low-boiling mixture to form a liquid hydrofluoric acid phase and a liquid paraffin hydrocarbon phase, returning said hydrofluoric acid to the aforesaid treatment, returning said paraffin to said extraction, and also separating from said distillationg means a hydrocarbon fraction containing an alkylbenzene so produced.

4. In a process of producing toluene, the step which comprises reacting a polyalkylbenzene containing at least one methyl group with a molecular excess of benzene in the presence of hydrofluoric acid at an elevated temperature in the range of about 350 to 800° F. to form toluene.

5. A process for converting a polyalkyl aromatic hydrocarbon to an alkyl aromatic hydrocarbon having a fewer number of alkyl groups per molecule, which comprises treating an admixture of a polyalkyl aromatic hydrocarbon, an aromatic hydrocarbon having at least two alkyl groups per molecule fewer than said polyalkyl aromatic hydrocarbon, and hydrofluoric acid as the effective catalyst under reaction conditions to produce an alkyl aromatic hydrocarbon having fewer alkyl groups per molecule than said polyalkyl aromatic hydrocarbon, passing effluents of said treatment to separating means under conditions such as to effect separation between a liquid hydrocarbon phase and a liquid hydrofluoric acid phase, passing said hydrocarbon phase to fractional distillation means, extracting said hydrofluoric acid phase with a low boiling paraffin hydrocarbon in liquid phase to remove from said hydrofluoric acid hydrocarbons dissolved therein, passing hydrocarbon material resulting from said extraction to the aforesaid distillation means, separating from said distillation means as a low boiling fraction a mixture ecomprising said low boiling paraffin and hydrofluoric acid, cooling and condensing said low-boiling mixture to form a liquid hydrofluoric acid phase and a liquid paraffin hydrocarbon phase, returning said hydrofluoric acid to the aforesaid treatment, returning said paraffin to said extraction, and also separating from said distillation means a hydrocarbon fraction containing an alkyl aromatic hydrocarbon so produced.

6. A process for dealkylating a nuclear alkylated polyalkyl cyclic hydrocarbon having at least 5 carbon atoms in the ring, which comprises treating an admixture of such a polyalkyl cyclic hydrocarbon, a cyclic hydrocarbon having at least 5 carbon atoms in the ring and having at least two alkyl groups per molecule fewer than said polyalkyl cyclic hydrocarbon, and hydrofluoric acid as the effective catalyst under reaction conditions to produce an alkyl cyclic hydrocarbon having fewer alkyl groups per molecule than said polyalkyl cyclic hydrocarbon, passing effluents of said treatment to separating means under conditions such as to effect separation between a liquid hydrocarbon phase and a liquid hydrofluoric acid phase, passing said hydrocarbon phase to fractional distillation means, extracting said hydrofluoric acid phase with a low-boiling paraffin hydrocarbon in liquid phase to remove from said hydrofluoric acid hydrocarbons dissolved therein, passing hydrocarbon material resulting from said extraction to the aforesaid distillation means, separating from said distillation means as a low-boiling fraction a mixture comprising said low-boiling paraffin and hydrofluoric acid, cooling and condensing said low-boiling mixture to form a liquid hydrofluoric acid phase and a liquid paraffin hydrocarbon phase, returning said hydrofluoric acid to the aforesaid treatment, returning said paraffin to said extraction, and also separating from said distillation means a hydrocarbon fraction containing an alkyl cyclic hydrocarbon so produced.

FREDERICK E. FREY.

REFERENCES CITED

The following references are of record in the file of this patent:

UNITED STATES PATENTS

| Number | Name | Date |
| --- | --- | --- |
| 2,238,594 | Malishev | Apr. 15, 1941 |
| 2,275,312 | Tinker et al. | Mar. 3, 1942 |

OTHER REFERENCES

Simons, Ind. & Eng. Chem. 32 178 (1940). (Copy in Div. 31, 260–671.)

Simons et al., "Journal of the American Chem. Soc.," vol. 60, pp. 986 and 2952–2953 (1938), 260–671. (Copy in Sci. Lib.)